US005080940A

United States Patent [19]

Kugimiya

[11] Patent Number: 5,080,940

[45] Date of Patent: Jan. 14, 1992

[54] LATENT IMAGE PROJECTING MIRROR SURFACE BODY

[75] Inventor: Koichi Kugimiya, Toyonaka, Japan

[73] Assignee: Matsushita Electric Industrial Co., Ltd., Osaka, Japan

[21] Appl. No.: 443,392

[22] Filed: Nov. 30, 1989

[30] Foreign Application Priority Data

Dec. 5, 1988 [JP] Japan ................................ 63-307384

[51] Int. Cl.[5] ................................................ G02B 5/08

[52] U.S. Cl. ..................................... 428/29; 272/8 M; 428/912.2; 434/303; 359/838

[58] Field of Search ......................... 40/219; 272/8 M; 350/600, 630; 356/237, 371, 445; 428/29, 912.2; 430/9; 434/303

[56] References Cited

U.S. PATENT DOCUMENTS 4,141,058 2/1979 Mizohata et al. ............ 428/912.2 X
4,547,073 10/1985 Kugimiya .................... 428/912.2 X
4,585,931 4/1986 Duncan et al. ..................... 235/464

FOREIGN PATENT DOCUMENTS 57-134612 8/1982 Japan ................................ 428/912.2
57-186106 11/1982 Japan ................................ 428/912.2

*Primary Examiner*—Henry F. Epstein
*Attorney, Agent, or Firm*—Stevens, Davis, Miller & Mosher

[57] ABSTRACT

Provided is a magic mirror device comprising a substrate having a front surface which is mirror-finished while having slight recesses and a rear surface having no protrusion on which nicked marks are formed in stead of protrusions, wherein the thickness of the substrate is less than 10 mm while the depth of nicked marks are less than 20 μm, thereby it is possible to precisely read a latent image on the mirror-finished front surface thereof upon irradiation of light onto the front surface.

6 Claims, 1 Drawing Sheet

LATENT IMAGE PROJECTING MIRROR SURFACE BODY

BACKGROUND OF THE INVENTION

1. Field of the Invention

The present invention relates to a latent image projecting mirror surface body and, more particularly, to a latent image projecting mirror surface body which can be utilized as one for recognition of secret codes or one for ornamentation of gadgets or articles.

2. Statement of the Related Art

There has conventionally been a classical magic mirror, as a mirror surface body similar to a latent image projecting mirror surface body. This magic mirror is based upon such a phenomenon that images for example which are deeply sculptured in its back surface so as to form protrusions give convexities and concavities on its front mirror surface when the same is polished, and that such images are reflected in the reflected light.

The principle of the above-mentioned magic mirror will hereinafter be described with reference to the drawings.

FIG. 1 schematically shows a mirror surface body which has been subjected to a magic mirror process, wherein a light beam from a small light source 11 is projected through a pin hole 12 onto a mirror-polished substrate 13 where a shallow and wide recess 15 exists which recess 15 is produced on the front surface of the mirror surface body after polishing, and to the back surface of the body is formed therein with a sculpture 132. If there is no recess or protrusion or stain on the surface, then evenly distributed rays are reflected on the screen 14 thereby forming a simple even-brightness image of the corresponding shape to the mirror surface 131. However, since the shallow and moderate recess 15 exists on the surface 131, the recess part serves as a concave mirror which converses light, and reflects rays as shown by the dotted lines 16. Therefore, the light image formed on the screen 14 has non-uniform distribution of brightness as shown by a curve 17. That is, in general the light image on the screen 14 has a bright spot or bright region when the mirror face has a concave defect, and a dark spot or dark area when the mirror face has a convex defect. When the surface has parallel recess-shaped unevenness, the light image becomes a parallel shadow pattern, and one can detect such a shallow excess of 0.3 μm depth and 1 to 3 mm size.

In the above conventional example, the substrate 13 having its back surface formed therein with a protruded sculpture 132 must be polished on its front surface 131 into a mirror surface. Accordingly, a large amounts of time and expenditure is necessary for the formation of the images as well as for the conversion into the mirror surface.

Meanwhile, various methods for readily observing the latent images in the front surface of the substrate are known and have hitherto been proposed (for example Japanese Laid-Open Utility Model 57-134612, Japanese Laid-Open Patent 57-186106). In this case, however, nicked marks and the like on the substrate are formed in the front surface thereof for reading, so that such visible marks do not become secret codes on account of their visibility. In addition, because the marks and the like exist on the front surface, damages are caused to the front surface in view of an aesthetic appearance thereof. This imposes a limitation upon the use of the mirror surface bodies based on the above methods.

SUMMARY OF THE INVENTION

The present invention has been made in view of the above-described conventional inconveniences, and accordingly an object thereof of the present invention is to provide a mirror surface body and a front-substrate-surface mark detection method therefor which are capable of recognizing marks the back surface by irradiation of light onto the mirror surface only.

Namely, according to the present invention, there is provided a mirror surface body having a thickness equal to or less than 5 mm, and having a front surface polished into a mirror surface and a back surface sculptured with nicks giving images such as, characters or pictures having a depth equal to or greater than 0.1 μm, or a mirror surface body having a thickness equal to or less than 10 mm, and having a front surface polished into a mirror surface and a back surface sculptured with nicks giving images such as characters or pictures having a depth equal to or greater than 20 μm.

Further, according to another aspect of the present invention, there is provided a latent image projecting mirror surface body characterized in that the mirror surface body has a thickness equal to or less than 5 mm, and having a front surface polished into a mirror surface, and a back surface formed thereon with nicks giving images such as characters or pictures with no protrusions.

DESCRIPTION OF THE PREFERRED EMBODIMENT

In the present invention, it is possible to easily form a mirror surface body having concave and convex surface portions by using a plate like sheet of 5 mm or less thickness, at least one surface, constituting the front surface which is polished into a mirror surface, and by readily forming on the back surface normal marks such as images, characteristics, pictures or the like which are 0.1 μm or more in depth. Said concave and convex surface portions have latent images which are not visible to the naked eyes. It is to be noted that the formation of such marks can readily be made, for example, by use of energy beam such as a laser or electronic beam as well as by use of a cutter having sharp blade.

When light is irradiated onto the mirror surface body, despite the fact that nothing is apparently seen on the front surface, the corresponding latent images can be reflected as normal images on a projection screen, so that detection of the marks on the mirror surface body can be easily made.

Same things can be realized by using a plate sheet having less than 10 mm thickness, at least one surface, constituting the front surface which is polished into a mirror surface and the back surface which is formed with the normal marks such as images, characters or pictures which are 20 μm or more in depth.

Figure 1:
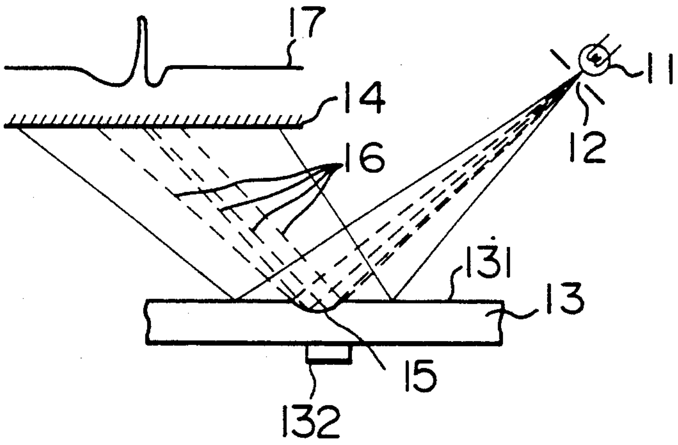
FIG. 1 PRIOR ART
FIG. 1 illustrates the principle of magic mirror.
Figure 2:
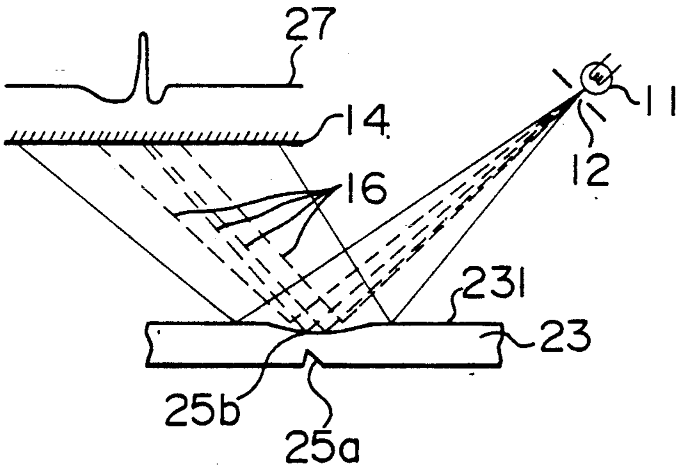
FIG. 2 illustrates the contents of the present invention.

A specific embodiment of the present invention will now be described in detail with reference to FIG. 2.

First of all, a glass plate 23 having both surfaces each of which were polished and which were 0.5 to 8 mm thickness and 50 mm square were prepared as specimens. One side surface of each specimen was slightly formed with slight nicks 25*a* by a diamond point or a sapphire cutter to depict a normal character. The depth of the nicks 25*a* ranged from 0.1 to 100 μm when measured by a surface roughness meter. The characters, that is, the so-called latent images are not seen when observed from the front surface 231.

Next, sun light or a light beam from a point light source 11 was projected through a pin hole 12 onto the surface 231 of the glass plate 23 and was projected onto a projection screen 14 spaced by a distance of 0.3 to 1 m from the surface 231.

In this case, when the glass plate 23 had a thickness of 5 mm or less, the character marked in the back surface of the glass plate 23 was observed almost as it standed on the screen 14. When, however, the glass plate 23 has a thickness of 5 mm, the character was observed on the screen 14 only where the depth of the nick 25*a* was approximately 3 μm or more. When the glass plate 23 has a thickness of greater than 5 mm, the character was difficult to be read and decoded. With regard to the glass plate 23 which is 2 mm or less in thickness, even the nick or character having a small depth of 0.1 μm was clearly deciphered to a sufficient extent. Forming nick is beneficial since no protrusion exists on the back surface.

The reason why the character was observed in such a way is presumed to lie on such a ground that non-visible fine concavities 25*b* are latently formed in the front surface when nicks are formed in the back surface of the glass plate 23.

That is, although not clearly analyzed at present, it is considered that the formation of a nicked mark on the back surface of a substrate gives stress which cause a strain on the opposite mirror-polished surface, thereby causing the formation of concavities and convexities thereon. Namely, these concavities and convexities are considered to cause the scattering of reflected light beams to thereby form images on a projection screen. In addition, there exists a correlation between the thickness of the glass plate 23 and the resolution of the images projected on the screen 14 and it was found that the smaller the thickness of the glass plate 23, the higher the resolution.

In the present invention, on the screen 14 the character which had been formed in the back surface was observed in the form of a normal posture. On the other hand, however, according to the above-described prior art, there was observed a so-called mirror image whose right or left side was reversed from the left or right side though the upper and lower sides remained unchanged. That is, in the case where the projection is made as in the present invention, it suffices to make normal images, characters, etc. in the back surface of the specimen. This gives simple marking.

In other words, according to the present invention, should a symbol, for example, "b", be described in the back surface of the glass plate 23 and the symbol be observed from the front surface 231, the symbol "d" reversed from "b" on the right and left sides would be obtained on the front surface although not recognized by the naked eyes. When light is irradiated onto such front surface and the image is projected upon the screen 14, the normal symbol "b" conveniently is observed.

On the other hand, should an image on the glass plate be taken up directly by use of, for example, an image pickup tube, it was found that the symbol "d" reversed from "b" on the right and left sides would be observed on a television screen. In this case, it is necessary to electronically invert the image in advance. The surface of the mirror can be copied by a plastic material whose surface has the same surface when a light beam is irradiated on the screen.

Next, stainless steel plates polished at one side surface thereof and having 0.05 to 8 mm thickness and 30 mm square size were prepared and they were similarly carved with characters in their back surface. In the case where the thickness was to an extent of 5 mm or less, the projected characters could be easily read if the thus formed nicks have a depth of 30 μm up to which nicks can be formed by ordinary force. Further, when nicks approximately 30 to 100 μm thick were formed by projection of a $CO_2$ laser, the characters in all specimens could be easily read. Next, on the contrary, when nicks were formed in the mirror surface 131 and light was projected upon the non-polished surface, no image could be observed.

Each stainless steel plate was curved beforehand so as to have a slight convex surface as a whole and was formed with nicks, similarly. When sunlight was irradiated upon the front convex surface, the character was observed being greatly magnified. This has been impossible with conventional magic mirrors.

Furthermore, specimens of marble having double-sided mirror surfaces were prepared. The thickness ranged between 0.5 mm and 10 mm. Nicks having grooves 20 to 100 μm depth were formed by use of electronic beams. As to all the specimens, the characters carved in the back surfaces thereof were seen and read in the projected images. Similar nicked characters were also formed by a laser beam. In this case as well, the characters were easily seen and read.

Shells were polished to prepare plates of double side mirror surfaces and similar carved characters were formed. When light was projected, the characters could be readily read.

When the characters or the like, obtained by such projection of light, were taken up directly into an image pickup tube and decoded by an electronic computer or the like, they could be recognized. In this case, however, since the above-mentioned reversion from-right-to-left or from-left-to-right occurs, the postures are required to be corrected by use of an optical system, electronic system or decoding software. It is to be noted that observation of the surfaces of such mirror surface bodies with the naked eyes resulted in observation of neither any mark nor any change thereon, thus maintaining the completeness of the surfaces thus providing that such characters are useful as secrete codes.

In the above-mentioned cases, description has been made taking characters as an example. Needless to say, however, the same advantages would be obtained even if images or pictures were formed in place of characters.

Further, since no nicks are recognized on the front mirror surface of the mirror surface body, it is, of course, possible to effectively utilize the mirror surface per se for various purposes.

As has been described above, according to the present invention, it is possible to easily form latent images beneath the mirror surface by carving characters or the like in the back surface of the substrate and without damaging the front mirror surface of the substrate, and to project such latent images upon a projection screen or the like in normal posture by irradiation of light onto the mirror surface, thus to make them visible. Thus, it is possible to provide a novel mirror surface body which can widely been applied as those for ornamentation, recognition, etc. in which the formation of any nick in the front mirror surface is undesirable. In addition, it is also possible to easily form latent images in the front convex mirror surface, which were virtually unable to form with the prior art methods, thereby enabling observation of the enlarged latent images.

What is claimed is:

1. A latent image projection mirror surface body having a thickness of 2 mm or less and having a front surface which is formed thereon with a mirror surface and a back surface which is formed therein with nicks having detectable specific patterns of images, characters or pictures, said nicks having a depth of 0.1 μm or more.

2. The latent image projection mirror surface body as claimed in claim 1, characterized in that at least said front mirror surface thereof is made convex.

3. The latent image projection mirror surface body as claimed in claim 1, characterized in that said nicks are formed by use of a cutter blade or an energy beam.

4. A latent image projection mirror surface body having a thickness of not more than 10 mm and having a front surface which is formed thereon with a mirror surface and a back surface which is formed thereon with nicks having detectable specific patterns of images, characters or pictures, said nicks having a depth of 20 μm or more.

5. The latent image projection mirror surface body as claimed in claim 4, characterized in that at least said front mirror surface thereof is made to be convex.

6. The latent image projection mirror surface body as claimed in claim 5, characterized in that said nicks are formed by use of a cutter blade or an energy beam.

* * * * *